US010429503B2

(12) United States Patent
Bilik et al.

(10) Patent No.: US 10,429,503 B2
(45) Date of Patent: Oct. 1, 2019

(54) VEHICLE COGNITIVE RADAR METHODS AND SYSTEMS

(71) Applicant: GM GLOBAL TECHNOLOGY OPERATIONS LLC, Detroit, MI (US)

(72) Inventors: Igal Bilik, Rehovot (IL); Ran Y. Gazit, Ra'Anana (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 389 days.

(21) Appl. No.: 15/524,602

(22) PCT Filed: Jul. 3, 2014

(86) PCT No.: PCT/US2014/045471
§ 371 (c)(1),
(2) Date: May 4, 2017

(87) PCT Pub. No.: WO2016/003474
PCT Pub. Date: Jan. 7, 2016

(65) Prior Publication Data
US 2018/0284265 A1    Oct. 4, 2018

(51) Int. Cl.
*G01S 13/93*    (2006.01)
*B60W 30/08*    (2012.01)
(Continued)

(52) U.S. Cl.
CPC .......... *G01S 13/931* (2013.01); *B60W 30/08* (2013.01); *B60W 30/09* (2013.01); *G01S 7/41* (2013.01);
(Continued)

(58) Field of Classification Search
CPC ........ G01S 13/931; G01S 7/41; G01S 13/347; G01S 13/867; G01S 13/865; G01S 13/72;
(Continued)

(56) References Cited

U.S. PATENT DOCUMENTS 8,027,029 B2    9/2011  Lu et al.
8,350,638 B2    1/2013  White et al.
(Continued)

FOREIGN PATENT DOCUMENTS

CN    101581780 A    11/2009
CN    102879777 A    1/2013
(Continued)

OTHER PUBLICATIONS

Machine Translation of Holzmann, DE102010024328, Dec. 22, 2011 (Year: 2011).*

(Continued)

*Primary Examiner* — Frank J McGue
(74) *Attorney, Agent, or Firm* — Lorenz & Kopf, LLP

(57) ABSTRACT

Methods and systems for a vehicle cognitive radar are provided. The system includes a transmitter is configured to transmit a first plurality of transmittal signals for a cognitive radar system of a vehicle, the cognitive radar system having at least a first modality. An interface is configured to receive sensor data from one or more sensors having a second modality that is different from the first modality. A processor is coupled to the interface, and is configured to select an adjusted waveform for a second plurality of transmittal signals for the cognitive radar system using the sensor data.

20 Claims, 4 Drawing Sheets

(51) Int. Cl.
*G01S 13/72* (2006.01)
*G01S 13/86* (2006.01)
*G01S 7/41* (2006.01)
*G01S 13/34* (2006.01)
*G08G 1/04* (2006.01)
*B60W 30/09* (2012.01)
*G08G 1/16* (2006.01)

(52) U.S. Cl.
CPC ............ *G01S 13/347* (2013.01); *G01S 13/72* (2013.01); *G01S 13/865* (2013.01); *G01S 13/867* (2013.01); *G08G 1/04* (2013.01); *B60W 2420/52* (2013.01); *B60W 2550/10* (2013.01); *G01S 2013/9346* (2013.01); *G01S 2013/9353* (2013.01); *G08G 1/165* (2013.01); *G08G 1/166* (2013.01)

(58) Field of Classification Search
CPC .... G01S 2013/9353; G01S 2013/9346; B60W 30/09; B60W 30/08; B60W 2550/10; B60W 2420/52; G08G 1/04; G08G 1/166; G08G 1/165
USPC .......................................................... 342/146
See application file for complete search history.

(56) References Cited

U.S. PATENT DOCUMENTS

| | | | |
|---|---|---|---|
| 8,542,106 | B2 | 9/2013 | Hilsebecher et al. |
| 8,629,977 | B2 | 1/2014 | Phillips et al. |
| 8,686,906 | B2 | 4/2014 | White et al. |
| 8,704,719 | B2 | 4/2014 | Song et al. |
| 9,077,072 | B2 | 7/2015 | Song et al. |
| 2004/0178945 | A1 | 9/2004 | Buchanan |
| 2008/0019567 | A1* | 1/2008 | Takagi ............... G06K 9/00369 382/103 |
| 2008/0077015 | A1 | 3/2008 | Boric-Lubecke et al. |
| 2008/0260019 | A1 | 10/2008 | Aoyagi |
| 2011/0084871 | A1* | 4/2011 | Haykin .................. G01S 7/282 342/82 |
| 2011/0140949 | A1 | 6/2011 | Lee |
| 2012/0140061 | A1 | 6/2012 | Zeng |
| 2012/0330528 | A1 | 12/2012 | Schwindt et al. |
| 2013/0314272 | A1 | 11/2013 | Gross et al. |
| 2014/0035774 | A1 | 2/2014 | Khlifi |

FOREIGN PATENT DOCUMENTS

| | | |
|---|---|---|
| CN | 102944876 A | 2/2013 |
| DE | 4442189 A1 | 5/1996 |
| DE | 10326648 A1 | 1/2005 |
| DE | 102009054776 A1 | 8/2010 |
| DE | 102010024328 A1 | 12/2011 |

OTHER PUBLICATIONS

European Patent Office, Extended Search Report issued in European Patent Application No. 14896809.2 dated Jan. 3, 2018.
European Patent Office, Extended Search Report issued in European Patent Application No. 14896397.8 dated Dec. 15, 2017.
European Patent Office, Extended Search Report issued in European Patent Application No. 14896673.2 dated Dec. 15, 2017.
State Intellectual Property Office of the People's Republic of China, Office Action in Chinese Patent Application No. 201510383757.8 dated Mar. 20, 2017.
Amit Kumar Mishra, et al., "Information sensing for radar target classification using compressive sensing," IRS 2012, 19th International Radar Symposium, May 23-25, Warsaw, Poland, pp. 326-330.
Ming-Hua Xue, et al., "Research on Three-Dimensional Imaging Algorithm of Radar Target," Radar Science and Technology, vol. 11, No. 1, Feb. 2013, pp. 65-70.
International Searching Authority, International Search Report for PCT/US2014/45475, dated Dec. 12, 2014.
International Searching Authority, International Search Report for PCT/US2014/45471, dated Nov. 7, 2014.
International Searching Authority, International Search Report for PCT/US2014/45470, dated Nov. 7, 2014.
European Patent Office, Extended Search Report issued in European Patent Application No. 14896809.2 dated Apr. 19, 2018.

* cited by examiner

VEHICLE COGNITIVE RADAR METHODS AND SYSTEMS

CROSS REFERENCE TO RELATED APPLICATION

This application is a U.S. National-Stage entry under 35 U.S.C. § 371 based on International Application No. PCT/US14/45471, filed Jul. 3, 2014 which was published under PCT Article 21(2) and is incorporated in its entirety herein.

TECHNICAL FIELD

This application pertains to vehicles, and more particularly relates to methods and systems for vehicle cognitive radar.

BACKGROUND

Certain vehicles today utilize radar systems. For example, certain vehicles utilize radar systems to detect other vehicles, pedestrians, or other objects on a road in which the vehicle is travelling. Radar systems may be used in this manner, for example, in implementing automatic braking systems, adaptive cruise control, and avoidance features, among other vehicle features. A cognitive radar system is a specific type of radar system that adjusts the waveform of the transmitted radar signals based on the radar signals that it receives after reflection from other objects. While cognitive radar systems are generally useful for such vehicle features, in certain situations existing cognitive radar systems may have certain limitations. Accordingly, it is desirable to provide techniques for cognitive radar systems in vehicles, for example techniques pertaining to the detection and/or tracking of objects on the road in which the vehicle is travelling. It is also desirable to provide methods, systems, and vehicles utilizing such techniques. Furthermore, other desirable features and characteristics of the present invention will be apparent from the subsequent detailed description and the appended claims, taken in conjunction with the accompanying drawings and the foregoing technical field and background.

SUMMARY

In accordance with an exemplary embodiment, a method is provided for controlling transmissions of a cognitive radar system. The method comprises transmitting a first plurality of transmittal signals by a cognitive radar system of a vehicle, the cognitive radar system having at least a first modality, receiving sensor data from one or more sensors having a second modality that is different from the first modality, and selecting an adjusted waveform for a second plurality of transmittal signals for transmission by the cognitive radar system using the sensor data. In accordance with an exemplary embodiment, a cognitive radar control system is provided. The cognitive radar control system comprises a transmitter, an interface, and a processor. The transmitter is configured to transmit a first plurality of transmittal signals for a cognitive radar system of a vehicle. The cognitive radar system has at least a first modality. The interface is configured to receive sensor data from one or more sensors having a second modality that is different from the first modality. The processor is coupled to the interface, and is configured to select an adjusted waveform for a second plurality of transmittal signals for the cognitive radar system using the sensor data.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
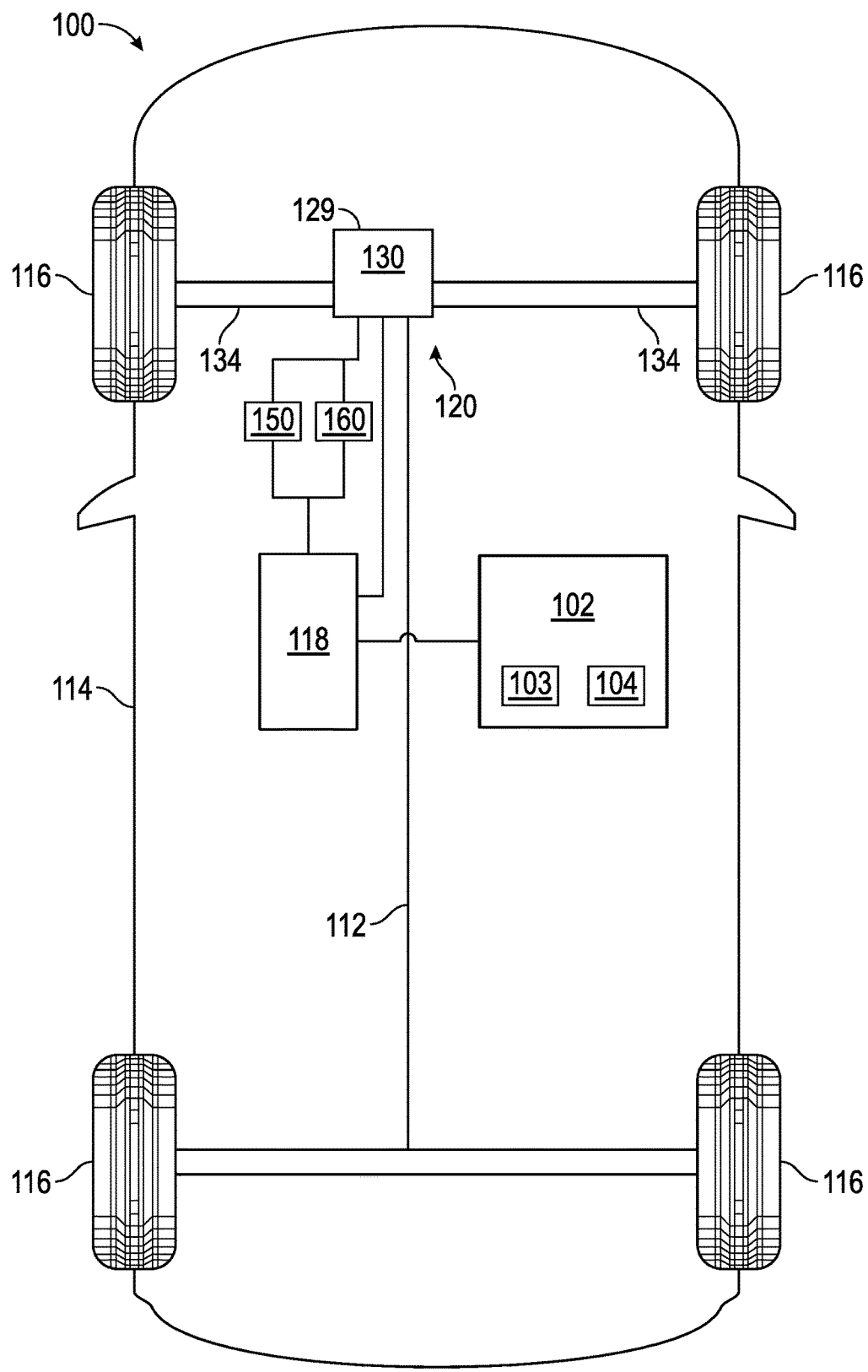
FIG. 1 is a functional block diagram of a vehicle that includes a control system including a cognitive radar system, in accordance with an exemplary embodiment.

FIG. 1 illustrates a vehicle 100, or automobile, according to an exemplary embodiment. As described in greater detail further below, the vehicle 100 includes a control system 102 for implementation of a cognitive radar system 103. In one embodiment, the control system 102 provides for modification of a waveform of radar signals transmitted by the cognitive radar system 103 having at least a first modality based upon additional information provided by one or more sensors 104 having a second modality that is different from the first modality. In one embodiment, the one or more sensors 104 may be part of the cognitive radar system 103 (e.g., in an embodiment in which the cognitive radar system 103 has multiple modalities). In another embodiment, the one or more sensors 104 may comprise additional sensors that are separate from and/or disposed in a different location from the cognitive radar system 103.

As depicted in FIG. 1, the vehicle 100 includes, in addition to the above-referenced control system 102, a chassis 112, a body 114, four wheels 116, an electronic control system 118, a steering system 150, and a braking system 160. The body 114 is arranged on the chassis 112 and substantially encloses the other components of the vehicle 100. The body 114 and the chassis 112 may jointly form a frame. The wheels 116 are each rotationally coupled to the chassis 112 near a respective corner of the body 114. In various embodiments the vehicle 10 may differ from that depicted in FIG. 1. For example, in certain embodiments the number of wheels 116 may vary. By way of additional example, in various embodiments the vehicle 10 may not have a steering system, and for example may be steered by differential braking, among various other possible differences.

In the exemplary embodiment illustrated in FIG. 1, the vehicle 100 includes an actuator assembly 120. The actuator assembly 120 includes at least one propulsion system 129 mounted on the chassis 112 that drives the wheels 116. In the depicted embodiment, the actuator assembly 120 includes an engine 130. In one embodiment, the engine 130 comprises a combustion engine. In other embodiments, the actuator assembly 120 may include one or more other types of engines and/or motors, such as an electric motor/generator, instead of or in addition to the combustion engine.

Still referring to FIG. 1, the engine 130 is coupled to at least some of the wheels 116 through one or more drive shafts 134. In some embodiments, the engine 130 is mechanically coupled to the transmission. In other embodiments, the engine 130 may instead be coupled to a generator used to power an electric motor that is mechanically coupled to the transmission. In certain other embodiments (e.g. electrical vehicles), an engine and/or transmission may not be necessary.

The steering system 150 is mounted on the chassis 112, and controls steering of the wheels 116. The steering system 150 includes a steering wheel and a steering column (not depicted). The steering wheel receives inputs from a driver of the vehicle 100. The steering column results in desired steering angles for the wheels 116 via the drive shafts 134 based on the inputs from the driver. Similar to the discussion above regarding possible variations for the vehicle 10, in certain embodiments the vehicle 10 may not include a steering wheel and/or steering. In addition, in certain embodiments, an autonomous vehicle may utilize steering commands that are generated by a computer, with no involvement from the driver.

The braking system 160 is mounted on the chassis 112, and provides braking for the vehicle 100. The braking system 160 receives inputs from the driver via a brake pedal (not depicted), and provides appropriate braking via brake units (also not depicted). The driver also provides inputs via an accelerator pedal (not depicted) as to a desired speed or acceleration of the vehicle, as well as various other inputs for various vehicle devices and/or systems, such as one or more vehicle radios, other entertainment systems, environmental control systems, lighting units, navigation systems, and the like (also not depicted). Similar to the discussion above regarding possible variations for the vehicle 10, in certain embodiments steering, braking, and/or acceleration can be commanded by a computer instead of by a driver (in one such embodiment, a computer of the vehicle may use input from the radar system to steer, brake, and/or accelerate the vehicle).

The control system 102 is mounted on the chassis 112. As mentioned above, the control system 102 provides for modification of a waveform of the radar signals transmitted by the cognitive radar system 103 based upon information provided by one or more sensors 104 having a different modality from at least one modality of the cognitive radar system 103. As discussed above, in one embodiment, the one or more sensors 104 may be part of the cognitive radar system 103 (e.g., in an embodiment in which the cognitive radar system 103 has multiple modalities). In another embodiment, the one or more sensors 104 may comprise additional sensors that are separate from and/or disposed in a different location from the cognitive radar system 103. The control system 102, in one example, provides these functions in accordance with the method 400 described further below in connection with FIGS. 4 and 5.

While the control system 102, the cognitive radar system 103, and the sensors 104 are depicted as being part of the same system, it will be appreciated that in certain embodiments these features may comprise two or more systems. In addition, in various embodiments the control system 102 may comprise all or part of, and/or may be coupled to, various other vehicle devices and systems, such as, among others, the actuator assembly 120, and/or the electronic control system 118.

Figure 2:
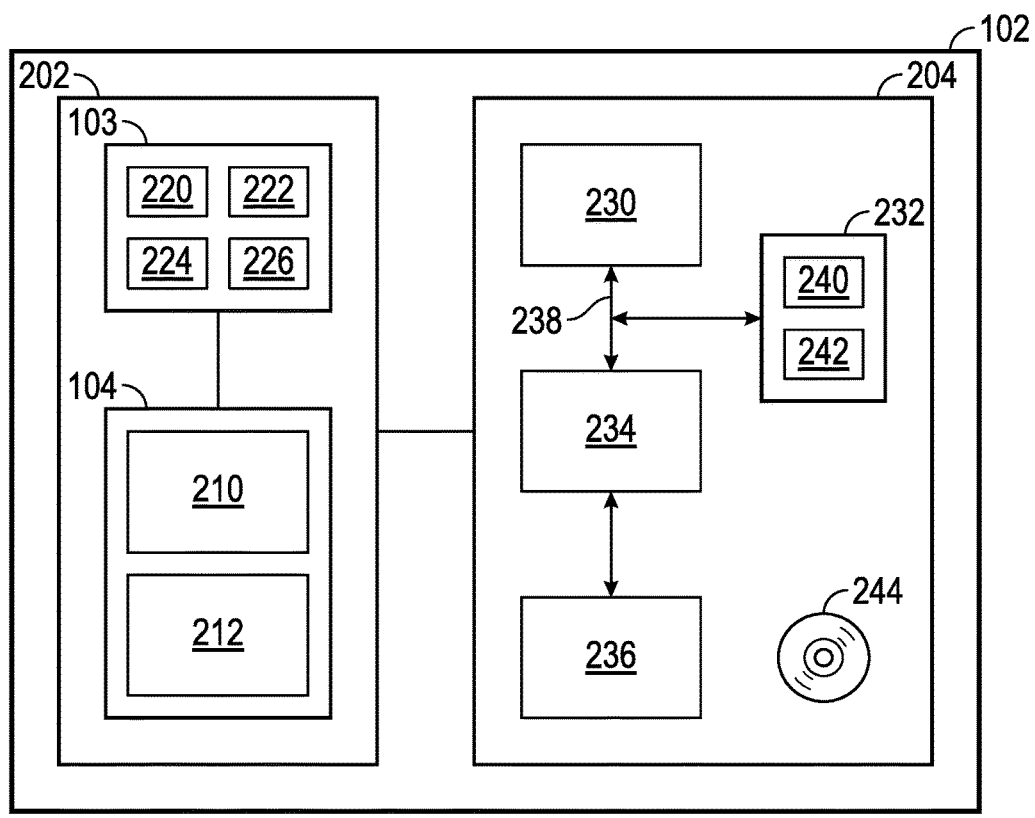
FIG. 2 is a functional block diagram of the control system of the vehicle of FIG. 1, in accordance with an exemplary embodiment.

With reference to FIG. 2, a functional block diagram is provided for the control system 102 of FIG. 1, in accordance with an exemplary embodiment. As depicted in FIG. 2, the control system 102 includes a sensor array 202 and a controller 204.

The sensor array 202 includes the cognitive radar system 103 and the one or more sensors 104 of FIG. 1. In the depicted embodiment, the sensors 104 include one or more cameras 210 and one or more light detection and ranging (LIDAR) systems 212. The camera(s) 210 and LIDAR system(s) 212 obtain respective sensor information identifying objects on or near a road in which the vehicle 100 is travelling, such as moving or stationary vehicles on or alongside the road, pedestrians, bicyclists, animals, buildings, trees, guard rails, medians, and/or other objects on or alongside the road. As discussed above, in one embodiment, the one or more sensors 104 may be part of the cognitive radar system 103 (e.g., in an embodiment in which the cognitive radar system 103 has multiple modalities). In another embodiment, the one or more sensors 104 may comprise additional sensors that are separate from and/or disposed in a different location from the cognitive radar system 103.

Also as depicted in FIG. 2, the cognitive radar system 103 includes a transmitter 220 (also referred to herein as a transmitting channel), a receiver 222 (also referred to herein as a receiving channel), an interface 224, and a digital processing unit 226. The transmitter 220 transmits radar signals from the cognitive radar system 103. The transmitted radar signals have waveforms that are initially set to a default waveform setting for the cognitive radar system 103. After the transmitted radar signals contact one or more objects on or near a road on which the vehicle 100 is travelling and is reflected/redirected toward the cognitive radar system 103, the redirected radar signals are received by the receiver 222 of the cognitive radar system 103 for processing.

The interface unit 224 receives information from the sensors 104 (e.g. from the one or more cameras 210 and LIDAR systems 212). The processing unit 226 processes, and selectively analyzes and interprets, the received radar signals along with the information from the sensors 104, in accordance with the method 400 described further below in connection with FIGS. 4 and 5. Specifically, in one embodiment, the processing unit 226 modifies the waveforms of future radar signals transmitted by the transmitter 220 based upon the received radar signals from the receiver 222 and the information from the sensors 104, for example based upon the characteristics of the objects detected on or along the road in which the vehicle 100 is travelling. The processing unit 226 of the illustrated embodiment is capable of executing one or more programs (i.e., running software) to perform various tasks instructions encoded in the program(s).

The processing unit 226 may be a microprocessor, microcontroller, application specific integrated circuit (ASIC) or other suitable device as realized by those skilled in the art. The cognitive radar system 103 may include multiple processing units 226, working together or separately, as is also realized by those skilled in the art. In certain embodiments, the processing unit 226 also includes or is associated with a memory (not depicted) of the cognitive radar system 103 for storing values (for example, previously stored waveforms of the transmitted radar signals) for use in the method 400 of FIGS. 4 and 5. In addition, it is noted that in certain embodiments, these functions may be performed in whole or in part by one or more other interfaces and/or processors disposed outside the cognitive radar system 103, such as the interface 234 and processor 230 of the controller 204 described further below.

As depicted in FIG. 2, the controller 204 is coupled to the cognitive radar system 103 and the sensors 104 of the sensor array 202. Similar to the discussion above, in certain embodiments the controller 204 may be disposed in whole or in part within or as part of the cognitive radar system 103. In addition, in certain embodiments, the controller 204 is also coupled to one or more other vehicle systems (such as the electronic control system 118 of FIG. 1). The controller 204 receives the information sensed or determined from the cognitive radar system 103 and the sensors 104. In addition, the controller 204 processes, and selectively analyzes and interprets, the received radar signals along with the information from the sensors 104. In one embodiment, the controller 204 changes the waveforms of future radar signals transmitted by the transmitter 220 based upon the received radar signals from the receiver 222 and the information from the sensors 104, for example based upon the characteristics of the objects detected on or along the road in which the vehicle 100 is travelling. The controller 204 generally performs these functions in accordance with the method 400 discussed further below in connection with FIGS. 4 and 5.

As depicted in FIG. 2, the controller 204 comprises a computer system. In certain embodiments, the controller 204 may also include one or more of the cognitive radar system 103, sensor(s) 104, one or more other systems, and/or components thereof. In addition, it will be appreciated that the controller 204 may otherwise differ from the embodiment depicted in FIG. 2. For example, the controller 204 may be coupled to or may otherwise utilize one or more remote computer systems and/or other control systems, such as the electronic control system 118 of FIG. 1.

In the depicted embodiment, the computer system of the controller 204 includes a processor 230, a memory 232, an interface 234, a storage device 236, and a bus 238. The processor 230 performs the computation and control functions of the controller 204, and may comprise any type of processor or multiple processors, single integrated circuits such as a microprocessor, or any suitable number of integrated circuit devices and/or circuit boards working in cooperation to accomplish the functions of a processing unit. During operation, the processor 230 executes one or more programs 240 contained within the memory 232 and, as such, controls the general operation of the controller 204 and the computer system of the controller 204, generally in executing the processes described herein, such as the method 400 described further below in connection with FIGS. 4 and 5.

The memory 232 can be any type of suitable memory. This would include the various types of dynamic random access memory (DRAM) such as SDRAM, the various types of static RAM (SRAM), and the various types of non-volatile memory (PROM, EPROM, and flash). In certain examples, the memory 232 is located on and/or co-located on the same computer chip as the processor 230. In the depicted embodiment, the memory 232 stores the above-referenced program 240 along with one or more stored values 242 for use in making the determinations.

The bus 238 serves to transmit programs, data, status and other information or signals between the various components of the computer system of the controller 204. The interface 234 allows communication to the computer system of the controller 204, for example from a system driver and/or another computer system, and can be implemented using any suitable method and apparatus. In one embodiment, the interface 234 obtains the additional data from the sensors 104 (e.g., camera data from the camera 210 and LIDAR data from the LIDAR system 212) for use in selectively analyzing the received radar signals of the cognitive radar system 103. The interface 234 can include one or more network interfaces to communicate with other systems or components. The interface 234 may also include one or more network interfaces to communicate with technicians, and/or one or more storage interfaces to connect to storage apparatuses, such as the storage device 236.

The storage device 236 can be any suitable type of storage apparatus, including direct access storage devices such as hard disk drives, flash systems, floppy disk drives and optical disk drives. In one exemplary embodiment, the storage device 236 comprises a program product from which memory 232 can receive a program 240 that executes one or more embodiments of one or more processes of the present disclosure, such as the steps of the method 400 (and any sub-processes thereof) described further below in connection with FIGS. 4 and 5. In another exemplary embodiment, the program product may be directly stored in and/or otherwise accessed by the memory 232 and/or a disk (e.g., disk 244), such as that referenced below.

The bus 238 can be any suitable physical or logical means of connecting computer systems and components. This includes, but is not limited to, direct hard-wired connections, fiber optics, infrared and wireless bus technologies. During operation, the program 240 is stored in the memory 232 and executed by the processor 230.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 230) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will similarly be appreciated that the computer system of the controller 204 may also otherwise differ from the embodiment depicted in FIG. 2, for example in that the computer system of the controller 204 may be coupled to or may otherwise utilize one or more remote computer systems and/or other control systems.

Figure 3:
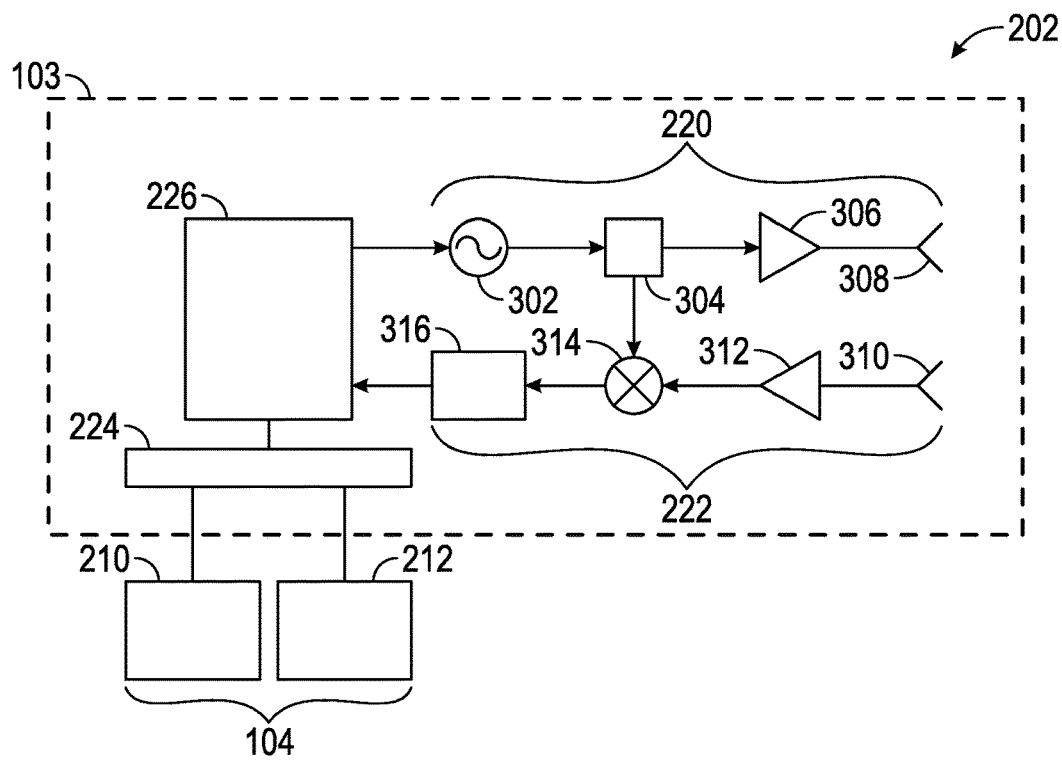
FIG. 3 is a functional block diagram of a sensor array of the control system of FIGS. 1 and 2, including the cognitive radar system, in accordance with an exemplary embodiment.

FIG. 3 is a functional block diagram of the sensor array 202 of the control system 102 of FIGS. 1 and 2, including the cognitive radar system 103 thereof, in accordance with an exemplary embodiment. Specifically, the cognitive radar system 103 of FIGS. 1 and 2 is depicted in FIG. 3 alongside sensors 104 of FIGS. 1 and 2, including the camera 210 and LIDAR system 212 of FIG. 2, in accordance with an exemplary embodiment. As discussed above, in one embodiment, the one or more sensors 104 may be part of the cognitive radar system 103 (e.g., in an embodiment in which the cognitive radar system 103 has multiple modalities). In another embodiment, the one or more sensors 104 may comprise additional sensors that are separate from and/or disposed in a different location from the cognitive radar system 103.

As depicted in FIG. 3, the cognitive radar system 103 includes the transmitting channel 220, the receiving channel 222, the interface unit 224, and the processing unit 226 of FIG. 2. The transmitting channel 220 includes a signal generator 302, a filter 304, an amplifier 306, and an antenna 308. The receiving channel 222 includes an antenna 310, an amplifier 312, a mixer 314, and a sampler/digitizer 316. In certain embodiments the antennas 308, 310 may comprise as single antenna, while in other embodiments the antennas 308, 310 may comprise separate antennas. Similarly, in certain embodiments the amplifiers 306, 312 may comprise a single amplifier, while in other embodiments the amplifiers 306, 312 may comprise separate amplifiers.

The cognitive radar system 103 generates the transmittal radar signals via the signal generator 302 based upon instructions provided by the processing unit 226 of FIG. 2. The transmittal radar signals are filtered via the filter 304, amplified via the amplifier 306, and transmitted from the cognitive radar system 103 (and from the vehicle 100) via the antenna 308. The transmitting radar signals subsequently contact other vehicles and/or other objects on or alongside the road on which the vehicle 100 is travelling. After contacting the other vehicles and/or other objects, the radar signals are reflected, and travel from the other vehicles and/or other objects in various directions, including some signals returning toward the vehicle 100. The radar signals returning to the vehicle 100 (also referred to herein as received radar signals) are received by the antenna 310, amplified by the amplifier 312, mixed by the mixer 314, and digitized by the sampler/digitizer 316. The received radar signals are then provided to the processing unit 226 for processing.

In addition to the received radar signals, the processing unit 226 also obtains additional data from the sensors 104 (namely, the camera 210 and the LIDAR system 212 of FIG. 2) via the interface unit 224. The processing unit 226 processes the received radar signals along with the additional data from the sensors 104. Specifically, in one embodiment, the processing unit 226 modifies the waveforms of the transmitted radar signals of the transmitter 220 for subsequent transmissions by the transmitter 220 based on the received radar signals and the additional data from the sensors 104, for example based upon the characteristics of the objects detected on or along the road in which the vehicle 100 is travelling, in accordance with the method 400 described below in connection with FIGS. 4 and 5.

Figure 4:
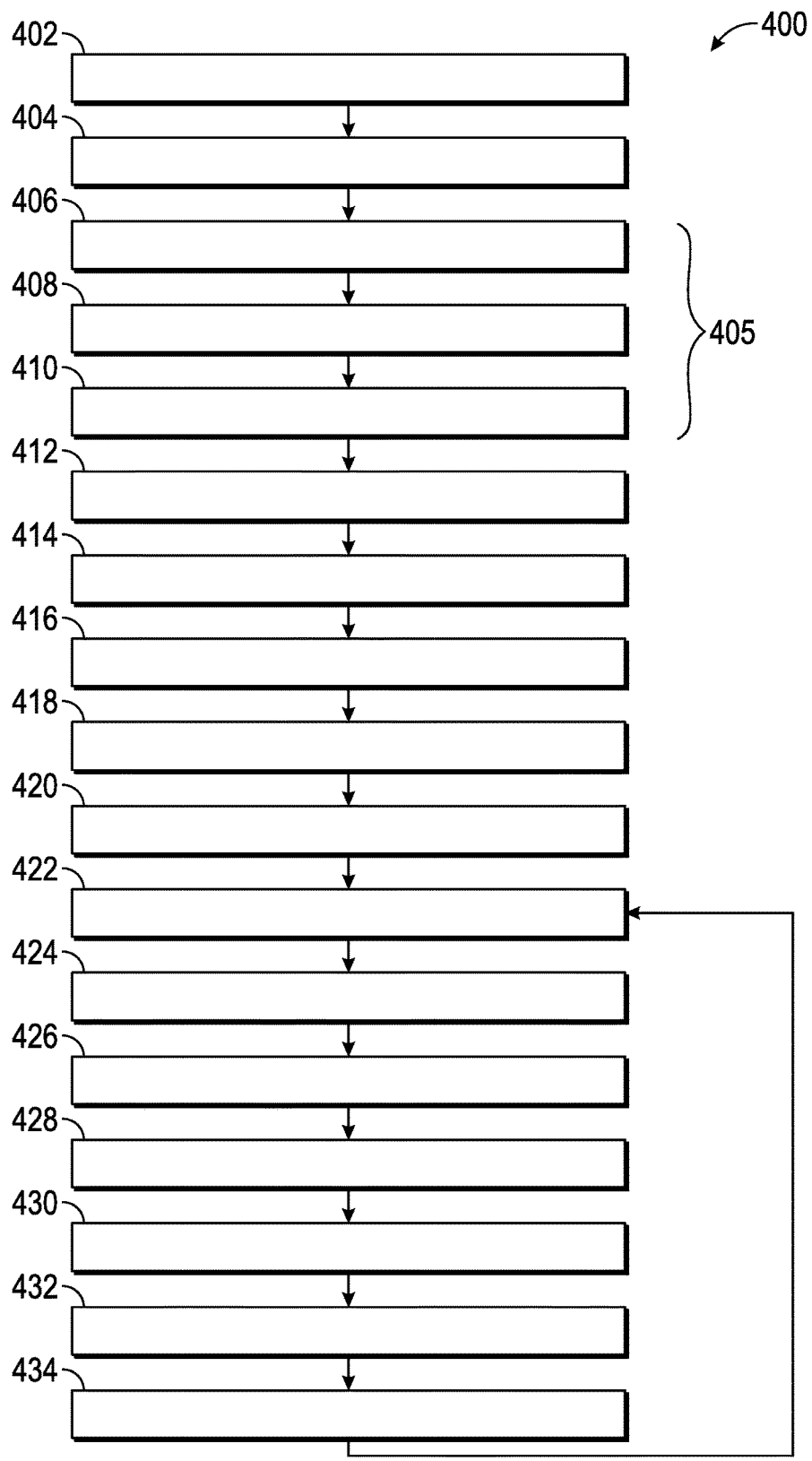
FIG. 4 is a flowchart of a method for implementing the cognitive radar system of a vehicle, which can be used in connection with the vehicle of FIG. 1, the control system of FIGS. 1 and 2, and the sensor array and cognitive radar system of FIGS. 2 and 3, in accordance with an exemplary embodiment.

FIG. 4 is a flowchart of a method 400 for implementing a radar system of a vehicle, in accordance with an exemplary embodiment. The method 400 can be implemented in connection with the vehicle 100 of FIG. 1, the control system 102 of FIGS. 1 and 2, the sensor array 202 and controller 204 of FIG. 2, and the cognitive radar system 103 of FIGS. 1-3, in accordance with an exemplary embodiment. The process 400 is also described below in connection with FIG. 5, which illustrates the vehicle 100, cognitive radar system 103, and sensors 104 as used while the vehicle 100 is driven on a roadway 500 in an urban environment with various obstacles, such as pedestrians 501, buildings 502, and other vehicles 503 depicted in FIG. 5, among other possible objects.

As depicted in FIG. 4, the method 400 includes transmitting a first plurality of radar signals of a first waveform at 402. In one embodiment, the first plurality of radar signals have a default waveform, and are transmitted by the cognitive radar system 103 of FIG. 1. Also in one embodiment, the default waveform comprises an initial setting for the default waveform for the cognitive radar system 103 of FIG. 1, prior to any specific knowledge of any objects that may be disposed on or around the road in which the vehicle 100 is travelling. In one embodiment, the default waveform is stored in the memory 232 of FIG. 2 in the stored values 242 thereof. Also in one embodiment, the default waveform may comprise the same initial waveform each time the vehicle 100 is powered up for a new vehicle drive or ignition cycle for the vehicle 100 of FIG. 1. In other embodiments, the waveform may vary with each iteration. In one embodiment, the initial wave form depends on the task, for example whether the task is detection, classification, or the like. The radar signals are, in one example, transmitted via the transmitting channel 220 of the cognitive radar system 103 of the vehicle 100 of FIG. 1. In one example depicted in FIG. 5, the radar signals are transmitted while the vehicle 100 of FIG. 1 is driving in a road in an urban environment, for example the road 500 of FIG. 5 with various pedestrians 501, buildings 502, and other vehicles 503, among other possible objects (e.g., other possible objects, such as bicyclists, animals, trees, guard rails, medians, and/or other various other objects).

Figure 5:
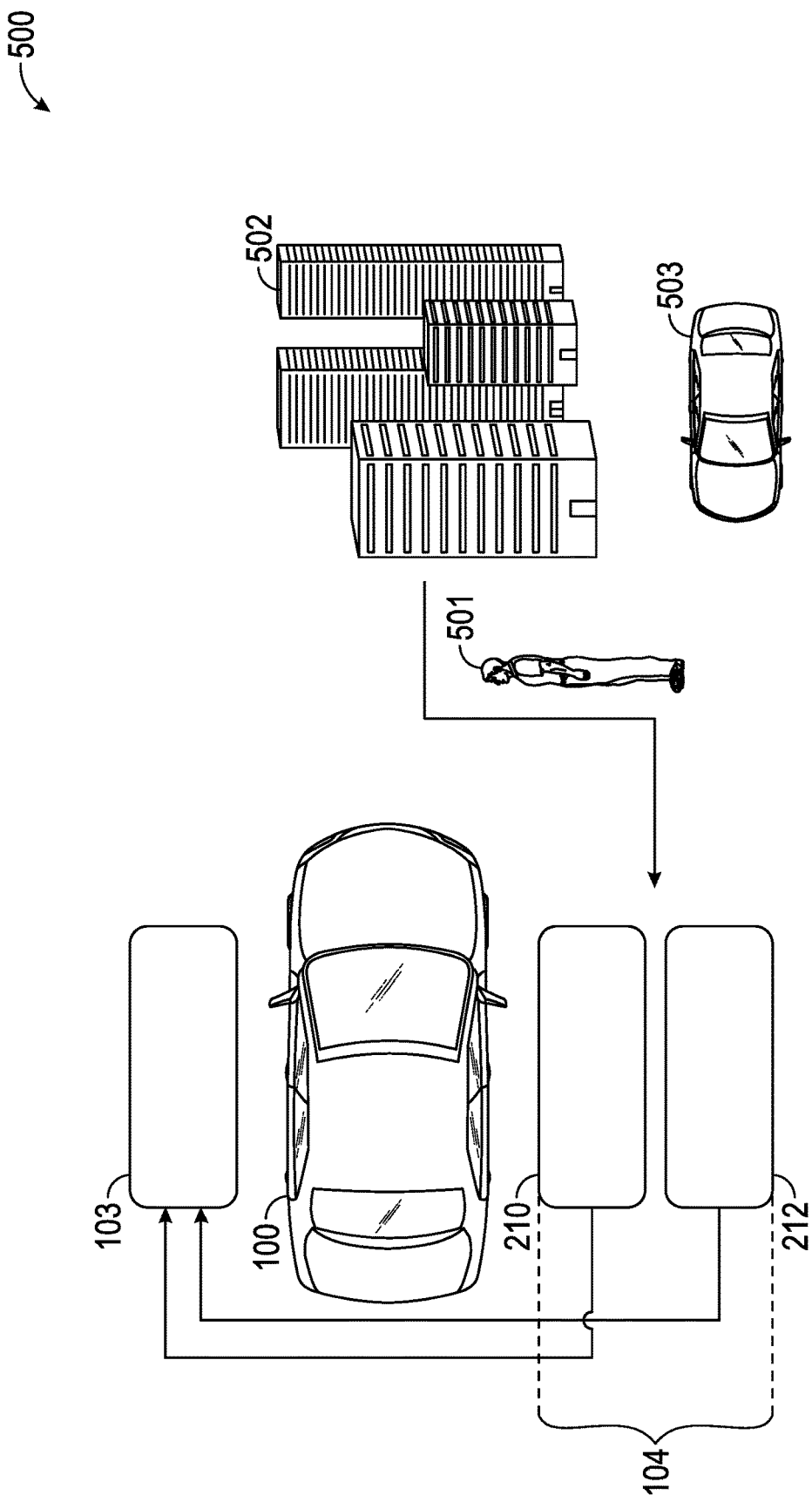
FIG. 5 is an illustration of an implementation of the method of FIG. 4, in accordance with an exemplary embodiment.

After the radar signals are reflected from objects on or around the road (e.g., the pedestrians 501, buildings 502, and other vehicles 503 of FIG. 5), return radar signals are received by the cognitive radar system 103 at 404 of FIG. 4. In one example, the received radar signals are received via the receiving channel 222 of the cognitive radar system 103 of the vehicle 100 (as referenced in FIGS. 1-3).

Additional data is obtained from one or more sensors at 405 of FIG. 4. In one example, additional data is obtained from the one or more sensors 104 of FIGS. 1-3, each having a different modality than at least one modality of the cognitive radar system 103. As used herein the term modality refers to a manner in which a sensor senses object, so that sensors having different modalities used different manners to sense objects (e.g., LIDAR, camera, ultrasonic, and the like each represent different modalities). As discussed above, in one embodiment, the one or more sensors 104 may be part of the cognitive radar system 103 (e.g., in an embodiment in which the cognitive radar system 103 has multiple modalities). In another embodiment, the one or more sensors 104 may comprise additional sensors that are separate from and/or disposed in a different location from the cognitive radar system 103. The additional data comprises object-level data generated by the sensors 104 with respect to the objects from which the received radar signals were reflected (e.g. the pedestrians 501, buildings 502, and other vehicles 503 of FIG. 5). In one embodiment, "object-level" data means measurements characterizing object properties as a whole (for example, its type/class, shape, size, specularity/transparency/material properties). In one embodiment, 405 includes two sub-steps, namely, (i) receiving camera data from the camera 210 of FIGS. 2 and 3 pertaining to objects on or along the road from which the received radar signals were reflected at 406; and (ii) receiving LIDAR data from the LIDAR system 212 of FIGS. 2 and 3 from such objects on or along the road from which the received radar signals were reflected at 408. In certain embodiments, 405 may also include obtaining additional data from one or more other non-depicted sensors, such as cameras and ultrasonic sensors, at 410. The additional data is generally obtained via an interface, such as the interface unit 224 and/or the interface 234 of FIG. 2.

Determinations are made as to objects on or around the road at 412 and 414. Specifically, in one embodiment, the objects are initially identified at 412 based upon the received radar signals of 404 and the additional information of 405. In addition, in one embodiment, the type(s) of the objects are determined at 414 based on various characteristics of the objects. By way of example, the type of an object may comprise a classification of whether an object belongs into a particular predefined category, such as a pedestrian, a bicyclist, an animal, a stationary vehicle, a moving vehicle, a stationary vehicle, another type of stationary object (e.g. a building, a tree, median, or a guard rail), and so on. In one embodiment, geographic coordinates and physical measurements as to shape (e.g. sphere, cube, prism, pyramid, cone, cylinder, and/or portions and/or combinations thereof) and size (e.g., length, width, and height) of the objects (e.g. the pedestrians 501, buildings 502, and other vehicles 503) are also determined using the received radar signals of 404 and the additional data of 405 (e.g., using the object-level camera data of 406 and the object-level LIDAR data of 408), and are then used to determine the types of the objects that have been detected. Blocks 412 and 414 illustrated in FIG. 4 are performed by a processor, such as the processing unit 226 and/or the processor 230 of FIG. 2.

A tracking algorithm is determined for the detected object(s) at 416. The tracking algorithm is based upon one or more characteristics of the detected object(s) determined at 412 and 414 of FIG. 4. In one embodiment, an optimal tracking algorithm is determined based upon the type(s) of detected objects, as determined at 412 and 414. For example, in one embodiment, one type of tracking algorithm may be optimal for tracking pedestrians, while another tracking algorithm may be optimal for tracking bicyclists, while yet another tracking algorithm may be optimal for tracking other moving vehicles, while yet other tracking algorithms may be optimal for tracking buildings and/or other fixed objects, and so on. Block 416 of FIG. 4 is performed by a processor, such as the processing unit 226 and/or the processor 230 of FIG. 2. In one embodiment, the different tracking algorithms have differences that included the following: (i) if the objects are extended or small (isolated), i.e. partial or full "view" of the object; and (ii) the "sensory" variability of the objects during their motions. In one such embodiment, this influences the object priors used by algorithms, the ways to "associate" different object representation during motion and priors about object motion.

At 418, a waveform is selected for the tracking algorithm determined at 416. In one embodiment, the waveform comprises an amplitude and a frequency for transmitted radar signals of the cognitive radar system 103 of FIG. 1 that correspond to the tracking algorithm determined at 416. For example, if a pedestrian tracking algorithm is determined or selected at 416, then a waveform associated with the pedestrian tracking algorithm is selected at 418. Similarly, if a vehicle tracking algorithm is determined or selected at 416, then a waveform associated with the vehicle tracking algorithm is selected at 418, and so on. Also in one embodiment, the characteristics of the waveform are stored in the memory 232 of FIG. 2 as stored values 242 thereof, and are retrieved therefrom and selected by a processor, such as the processing unit 226 and/or the processor 230 of FIG. 2. In one embodiment, the waveforms are selected in adaptive way in order to optimize some criterion (e.g., probability of detection or probability of resolution or Cramer Rao lower bound). Also in one embodiment, any parameters of the transmitted waveform can be modified, any arbitrary waveform can be result of the optimization process, and such arbitrary waveform can be adaptively selected to optimize some criterion of interest.

The waveform of the transmitted radar signals is adjusted at 420. Specifically, the waveform for future radar signals for the cognitive radar system 103 is adjusted to correspond to the selected waveform of 418. Specifically, in one embodiment, the adjusted waveform of 420 includes a different amplitude and a different frequency than the initial or default waveform transmitted at 402 (and/or from one or more prior transmitted waveforms). In addition, in one embodiment, in subsequent iterations the waveform will be continually adjusted (e.g. to have a different amplitude and a different frequency from the waveform of the most recently transmitted waveform and/or from one or more prior waveforms). Also in one embodiment, the cognitive radar system 103 operates in a continuous manner, such that waveforms are adapted continuously based on information collected by the system. In one embodiment, this information includes the output of one or more previous transmission cycles. In one embodiment, this information may be based on data coming from multiple sources over an extended period of time, and not necessarily on the output of the previous transmission cycle. Also in one embodiment, the adjustment of the waveform is implemented via instructions provided by a processor, such as the processing unit 226 and/or the processor 230 of FIG. 2, to the signal generator 302 of FIG. 3. In one embodiment, operation of the radar sensor is periodical, so that each time the selected waveform is a result of an optimization process that uses all previous measurements that result from the transmission of other waveforms that were selected previously.

Additional radar signals of an adjusted waveform are transmitted at 422. Specifically, a second plurality of radar signals, having the adjusted waveform of 420 (e.g., modified from the original waveform of 402, in one example) are transmitted by the cognitive radar system 103 of FIG. 1 at 422. The radar signals are, in one example, transmitted via the transmitting channel 220 of the cognitive radar system 103 of the vehicle 100 of FIG. 1.

After the second plurality of radar signals are reflected from objects on or around the road (e.g., the pedestrians 501, buildings 502, and other vehicles 503 of FIG. 5), new return radar signals are received by the cognitive radar system 103 at 424. Similar to 404 discussed above, in one example at 424 radar signals are received via the receiving channel 222 of the cognitive radar system 103 of the vehicle 100 (as referenced in FIGS. 1-3).

In addition, new additional data is obtained from one or more sensors at 426. In one example, additional data is obtained from the one or more sensors 104 of FIGS. 1-3 (including camera data from the camera 210 of FIGS. 2 and 3 and LIDAR data from the LIDAR system 212 of FIGS. 2 and 3), similar to 405 described above.

The received radar signals and additional data of 424 and 426 are implemented at 428-434. Specifically, in one embodiment, objects on or along the road are identified and classified at 428, similar to 412 and 414 discussed above, but using the new signals and data from 424 and 426. In addition, in one embodiment, the objects are further tracked at 430, for example by tracking changes in movement and/or position of the objects using the radar signals and the additional data of 424 and 426 in combination with the tracking algorithm of 416. In one embodiment, 424 and 426 are performed by a processor, such as the processing unit 226 and/or the processor 230 of FIG. 2.

Vehicle actions are initiated at 432 as appropriate based upon the classification and/or tracking of 428 and 430. In one example, if a distance between the vehicle 100 and a tracked object is less than a predetermined threshold (or an estimated time of contact between the vehicle 100 and the tracked object) under their current respective trajectories is less than a predetermined threshold), then an alert (e.g., a visual or audio alert to the driver) may be provided and/or an automatic vehicle control action (e.g., automatic braking and/or automatic steering) may be initiated, for example by a processor outputting one or more control signals for the steering system 150 and/or the braking system 160 of FIG. 1. In certain embodiments, such actions are initiated at 432 by the processing unit 226 and/or the processor 230 of FIG. 2. In addition, while 432 is depicted in FIG. 4 as being subsequent to 430 (and various other steps) for illustrative purposes, it will be appreciated that in various embodiments one or more actions of 432 may be implemented earlier in the method 400 in various embodiments.

In addition, in certain embodiments, the waveform of the transmitted radar signals may be modified further at 434. Specifically, in one embodiment, the waveform of subsequent transmitted radar signals of the cognitive radar system 103 may be modified again at 434 based upon the latest received radar signals and additional information of 424 and 426 and the determinations of 428, for example based on new and/or updated determinations of characteristics of the detected objects and associated tracking algorithms corresponding thereto, similar to 414-420 discussed above but with the latest, updated information.

In one embodiment, the process then proceeds to 422, as additional radar signals are transmitted for the cognitive radar system 103 using the most recent modified waveform (e.g., from 434, discussed above). Also in one embodiment, 422-434 thereafter repeat in various iterations, in one example continuously, throughout the current vehicle drive or ignition cycle for the vehicle 100 of FIG. 1.

Accordingly, the method 400 provides for control of a cognitive radar system for a vehicle using received radar signals from the cognitive radar system along with additional object-level data obtained from one or more sensors having a different modality from at least one modality of the radar system. Specifically, in accordance with one embodiment, the method 400 provides for the modification of the waveform of the transmitted radar signals of the cognitive radar system based on the characteristics of objects (e.g., pedestrians, bicyclists, other vehicles, fixed objects, or the like), for example to facilitate tracking of such objects.

It will be appreciated that the disclosed methods, systems, and vehicles may vary from those depicted in the Figures and described herein. For example, the vehicle 100, the control system 102, the cognitive radar system 103, the sensors 104, the sensor array 202, the controller 204, and/or various components thereof may vary from that depicted in FIGS. 1-3 and described in connection therewith. In addition, it will be appreciated that certain steps of the method 400 may vary from those depicted in FIGS. 4 and 5 and/or described above in connection therewith. It will similarly be appreciated that certain steps of the method described above may occur simultaneously or in a different order than that depicted in FIGS. 4 and 5 and/or described above in connection therewith.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the appended claims and the legal equivalents thereof.

What is claimed is:

1. A method for controlling transmissions of a cognitive radar system, the method comprising the steps of:
   transmitting a first plurality of transmittal signals by a cognitive radar system of a vehicle, the cognitive radar system having at least a first modality;
   receiving sensor data from one or more sensors having a second modality that is different from the first modality;
   identifying, via a processor, an object for tracking based on the sensor data;
   determining, via the processor, a classification as to a type of the object based on the sensor data;
   selecting, via the processor, an adjusted waveform for a second plurality of transmittal signals for transmission by the cognitive radar system, based on the determined type of the object using the sensor data; and
   tracking the object, via the processor, using the adjusted waveform for the second plurality of transmittal signals transmitted by the cognitive radar system based on the determined type of the object as determined using the sensor data.

2. The method of claim 1, wherein the selecting the adjusted waveform comprises selecting an adjusted frequency for the adjusted waveform based on the determined type of the object as determined using the sensor data.

3. The method of claim 1, wherein the selecting the adjusted waveform comprises selecting an adjusted amplitude for the adjusted waveform based on the determined type of the object as determined using the sensor data.

4. The method of claim 1, further comprising:
   receiving a plurality of cognitive radar return signals from the first plurality of transmittal signals;
   wherein the step of determining the classification comprises determining, via the processor, the classification as to the type of the object based on both the plurality of cognitive radar return signals and the sensor data;
   wherein the selecting the adjusted waveform comprises selecting the adjusted waveform based on the determined type of the object as determined using the plurality of cognitive radar return signals and the sensor data.

5. The method of claim 4, wherein:
   the step of receiving the sensor data comprises:
      receiving first sensor data with respect to the object, after one or more of the cognitive radar return signals have been reflected from the object, from one or more first sensors having the second modality that is different from the first modality; and
      receiving second sensor data with respect to the object, after one or more of the cognitive radar return signals have been reflected from the object, from one or more second sensors having a third modality that is different from both the first modality and the second modality;
   the step of identifying the object comprises identifying the object for tracking, via the processor, based on both the first sensor data and the second sensor data;

the step of selecting the adjusted waveform comprises selecting the adjusted waveform for the second plurality of transmittal signals for transmission by the cognitive radar system, via the processor, based on the determined type of the object using the first sensor data and the second sensor data; and the step of tracking the object comprises tracking the object using the adjusted waveform for the second plurality of transmittal signals transmitted by the cognitive radar system, via the processor, based on the determined type of the object as determined using the first sensor data and the second sensor data.

6. The method of claim 5, wherein:
the one or more first sensors comprise one or more cameras; and
the one or more second sensors comprise one or more lidar sensors.

7. The method of claim 1, further comprising:
selecting, via the processor, an optimal tracking algorithm for tracking the object based on the determined type of object using the sensor data;
wherein:
the step of selecting the adjusted waveform comprises selecting, via the processor, the adjusted waveform corresponding to the selected optimal tracking algorithm; and
the step of tracking the object comprises tracking the object, via the processor, using the adjusted waveform with the selected optimal tracking algorithm.

8. The method of claim 7, wherein:
the step of selecting the optimal tracking algorithm comprises selecting, via the processor:
a first optimal tracking algorithm, having a first adjusted waveform, when the target object is determined to be a pedestrian; and
a second optimal tracking algorithm that is different from the first optimal tracking algorithm and having a second adjusted waveform that is different than the first adjusted waveform, when the target object is determined to be a motorized vehicle; and
the step of tracking the object comprises tracking the object, via the processor, using:
the first adjusted waveform with the first optimal tracking algorithm, when the target is determined to be a pedestrian; and
the first adjusted waveform with the first optimal tracking algorithm, when the target is determined to be a motorized vehicle.

9. The method of claim 8, wherein:
the step of selecting the optimal tracking algorithm further comprises selecting, via the processor, a third optimal tracking algorithm that is different from both the first optimal tracking algorithm and the second optimal tracking algorithm, and having a third first adjusted waveform that is different from both the first adjusted waveform and the second adjusted waveform, when the target object is determined to be a bicycle; and
the step of tracking the object further comprises tracking the object, via the processor, using the third adjusted waveform with the third optimal tracking algorithm when the target is determined to be a bicycle.

10. A cognitive radar control system comprising:
a transmitter configured to transmit a first plurality of transmittal signals for a cognitive radar system of a vehicle, the cognitive radar system having at least a first modality;

an interface configured to receive sensor data from one or more sensors having a second modality that is different from the first modality; and
a processor coupled to the interface and configured to:
identify an object for tracking based on the sensor data;
determine a classification as to a type of the object based on the sensor data;
select an adjusted waveform for a second plurality of transmittal signals for the cognitive radar system, based on the determined type of the object using the sensor data; and
track the object, via the processor, using the adjusted waveform for the second plurality of transmittal signals transmitted by the cognitive radar system based on the determined type of the object as determined using the sensor data.

11. The cognitive radar control system of claim 10, wherein the processor is configured to select an adjusted frequency for the adjusted waveform based on the determined type of the object as determined using the sensor data.

12. The cognitive radar control system of claim 10, wherein the processor is configured to select an adjusted amplitude for the adjusted waveform based on the determined type of the object as determined using the sensor data.

13. The cognitive radar control system of claim 10, further comprising:
a receiver configured to receive a plurality of cognitive radar return signals from the first plurality of transmittal signals;
wherein the processor is configured to:
determine the classification as to the type of the object based on both the plurality of cognitive radar return signals and the sensor data; and
select the adjusted waveform based on the determined type of the object as determined using the plurality of cognitive radar return signals and the sensor data.

14. A vehicle comprising:
one or more sensor units having a first modality; and
a cognitive radar system having at least a second modality that is different from the first modality, the cognitive radar system including:
a transmitter configured to transmit a first plurality of transmittal signals;
an interface configured to receive sensor data from the one or more sensor units; and
a processor coupled to the interface and configured to:
identify an object for tracking based on the sensor data;
determine a classification as to a type of the object based on the sensor data;
select an adjusted waveform for a second plurality of transmittal signals for the cognitive radar system, based on the determined type of the object using the sensor data; and
track the object, via the processor, using the adjusted waveform for the second plurality of transmittal signals transmitted by the cognitive radar system based on the determined type of the object as determined using the sensor data.

15. The vehicle of claim 14, wherein:
the cognitive radar system further comprises a receiver configured to receive a plurality of cognitive radar return signals from the first plurality of transmittal signals; and
the processor is configured to select the adjusted waveform based on the determined type of the object as determined using the plurality of cognitive radar return signals and the sensor data.

16. The vehicle of claim 15, wherein:
the one or more sensor units comprise:
one or more first sensors, having the second modality that is different from the first modality, and that are configured to generate first sensor data with respect to the object, after one or more of the cognitive radar return signals have been reflected from the object; and
one or more second sensors, having a third modality that is different from both the first modality and the second modality, and that are configured to generate second sensor data with respect to the object, after one or more of the cognitive radar return signals have been reflected from the object; and
the processor is further configured to:
identify the object for tracking, based on both the first sensor data and the second sensor data;
select the adjusted waveform for the second plurality of transmittal signals for transmission by the cognitive radar system, based on the determined type of the object using the first sensor data and the second sensor data; and
track the object using the adjusted waveform for the second plurality of transmittal signals transmitted by the cognitive radar system, based on the determined type of the object as determined using the first sensor data and the second sensor data.

17. The vehicle of claim 16, wherein:
the one or more first sensors comprise one or more first cameras; and
the one or more second sensors comprise one or more lidar sensors.

18. The vehicle of claim 14, wherein the processor is further configured to:
select an optimal tracking algorithm for tracking the object based on the determined type of object using the sensor data;
select the adjusted waveform corresponding to the selected optimal tracking algorithm; and
track the object using the adjusted waveform with the selected optimal tracking algorithm.

19. The vehicle of claim 18, wherein the processor is further configured to:
select:
a first optimal tracking algorithm, having a first adjusted waveform, when the target object is determined to be a pedestrian; and
a second optimal tracking algorithm that is different from the first optimal tracking algorithm and having a second adjusted waveform that is different than the first adjusted waveform, when the target object is determined to be a motorized vehicle; and
track the object, using:
the first adjusted waveform with the first optimal tracking algorithm, when the target is determined to be a pedestrian; and
the first adjusted waveform with the first optimal tracking algorithm, when the target is determined to be a motorized vehicle.

20. The vehicle of claim 19, wherein the processor is further configured to:
select a third optimal tracking algorithm that is different from both the first optimal tracking algorithm and the second optimal tracking algorithm, and having a third first adjusted waveform that is different from both the first adjusted waveform and the second adjusted waveform, when the target object is determined to be a bicycle; and
track the object, using the third adjusted waveform with the third optimal tracking algorithm when the target is determined to be a bicycle.

* * * * *